United States Patent
Ishizaki et al.

(10) Patent No.: US 7,500,755 B2
(45) Date of Patent: Mar. 10, 2009

(54) DISPLAY APPARATUS AND IMAGE PROCESSING SYSTEM

(75) Inventors: Hideaki Ishizaki, Tokyo (JP); Wataru Takahashi, Tokyo (JP); Kuniko Ushiro, Tokyo (JP); Yuki Nagai, Tokyo (JP)

(73) Assignees: Pioneer Corporation, Tokyo (JP); Pioneer Design Corporation, Takyo (JP)

( * ) Notice: Subject to any disclaimer, the term of this patent is extended or adjusted under 35 U.S.C. 154(b) by 178 days.

(21) Appl. No.: 10/869,035

(22) Filed: Jun. 17, 2004

(65) Prior Publication Data

US 2005/0018140 A1 Jan. 27, 2005

(30) Foreign Application Priority Data

Jun. 18, 2003 (JP) ............................ P2003-173270

(51) Int. Cl.
- G03B 21/26 (2006.01)
- H04N 7/14 (2006.01)
- H04N 7/18 (2006.01)
- G09B 11/00 (2006.01)
- G09B 19/00 (2006.01)
- G09B 23/28 (2006.01)
- G09B 25/00 (2006.01)

(52) U.S. Cl. .............................. 353/28; 353/10; 353/29; 353/122; 348/14.1; 348/77; 434/86; 434/90; 434/89; 434/99; 434/100; 434/269; 434/270; 434/267; 434/377; 434/371

(58) Field of Classification Search .................. 353/30, 353/28, 99, 20, 31, 39, 37, 94, 102, 11, 10, 353/29, 122, 74; 359/449, 460, 630, 634, 359/838, 744; 348/14.07, 14.08, 14.1, 77, 348/78; 434/86, 90, 89, 99–104, 269, 270, 434/267, 377, 371

See application file for complete search history.

(56) References Cited

U.S. PATENT DOCUMENTS

| | | | | |
|---|---|---|---|---|
| 4,297,724 A | * | 10/1981 | Masuda et al. | 348/77 |
| 4,539,585 A | * | 9/1985 | Spackova et al. | 382/100 |
| 4,971,312 A | * | 11/1990 | Weinreich | 472/63 |
| 5,993,006 A | * | 11/1999 | Takeuchi et al. | 353/30 |
| 6,042,235 A | * | 3/2000 | Machtig et al. | 353/28 |
| 6,379,012 B1 | * | 4/2002 | Enochs et al. | 353/79 |
| 6,882,358 B1 | * | 4/2005 | Schuster et al. | 348/14.16 |
| 7,088,386 B2 | * | 8/2006 | Goto | 348/77 |
| 2003/0016236 A1 | * | 1/2003 | Bronson | 345/633 |

FOREIGN PATENT DOCUMENTS

| | | |
|---|---|---|
| JP | 2002-133280 A | 5/2002 |
| JP | 2002-229494 A | 8/2002 |
| JP | 2002-247674 A | 8/2002 |
| KR | 1996-0018974 A | 6/1996 |

* cited by examiner

*Primary Examiner*—Diane I Lee
*Assistant Examiner*—Magda Cruz
(74) *Attorney, Agent, or Firm*—Sughrue Mion, PLLC

(57) ABSTRACT

A display apparatus includes a half mirror for allowing light incident from the rear to pass through to the front and reflecting light incident from the front toward the front, a display section placed at the rear of the half mirror, an image pickup section for picking up an image of the user and generating user image data, an image data retention section for retaining a plurality of pieces of attachment member image data, an image combining section for combining the attachment member image data selectively read from the image data retention section and the user image data to generate combined image data, and an image display control section for displaying the combined image data on the display section.

16 Claims, 11 Drawing Sheets

DISPLAY APPARATUS AND IMAGE PROCESSING SYSTEM

BACKGROUND OF THE INVENTION

1. Filed of the Invention

The invention relates to a display apparatus and an image processing system.

2. Description of the Related Art

A mirror with an information display function provided by adding an information display function aside from a mirror function to a half mirror has been known. (For example, refer to JP-A-2002-229494.)

Hitherto, a remote control display apparatus using a half mirror to provide agreeable appearance for the display face in a nondisplay state of information, the display apparatus for displaying necessary information in response to the operation state of a remote control switch has been known. (For example, refer to JP-A-2002-247674.)

Hitherto, a hair set advice system using the Internet for giving precise advice on the use method of a commodity to set any desired hairstyle has been known. (For example, refer to JP-A-2002-133280.)

However, the display apparatus in the related art described above has a part implemented as a half mirror for displaying predetermined information. Full use of the figure of the user reflected in the half mirror is not necessarily made.

Although the use method of a commodity to set any desired hairstyle is provided through the Internet, user's interest in total fashion is not served.

SUMMARY OF THE INVENTION

It is an object of the invention to provide a display apparatus and an image processing system actively using the image of the user picked up by a digital camera, etc., and the figure of the user reflected in a half mirror to enable simulation of a hair style, hair color, etc.

According to first aspect of the invention, there is provided with a display apparatus including:

a half mirror for allowing light incident from the rear to pass through to the front and reflecting light incident from the front toward the front;

a display section being placed at the rear of the half mirror;

an image pickup section for picking up an image of a user and generating user image data;

an image data retention section for retaining a plurality of pieces of attachment member image data;

an image combining section for combining the attachment member image data selectively read from the image data retention section and the user image data to generate combined image data; and an image display control section for displaying the combined image data on the display section.

According to second aspect of the invention, there is provided with an image processing system including an image processing server and a display apparatus connected through a network, wherein the image processing server includes:

an image data retention section for retaining a plurality of pieces of attachment member image data; and an image combining section for combining the attachment member image data selectively read from the image data retention section and the image data sent from the display apparatus through the network to generate combined image data, and wherein the display apparatus includes:

a half mirror for allowing light incident from the rear to pass through to the front and reflecting light incident from the front toward the front;

a display section being placed at the rear of the half mirror;

an image pickup section for picking up an image of a user and generating image data; and an image display control section for displaying the combined image data sent from the image processing server through the network on the display section.

BRIEF DESCRIPTION OF THE DRAWINGS

These and other objects and advantages of this invention will become more fully apparent from the following detailed description taken with the accompanying drawings in which.

DESCRIPTION OF THE PREFERRED EMBODIMENTS

Figure 1:
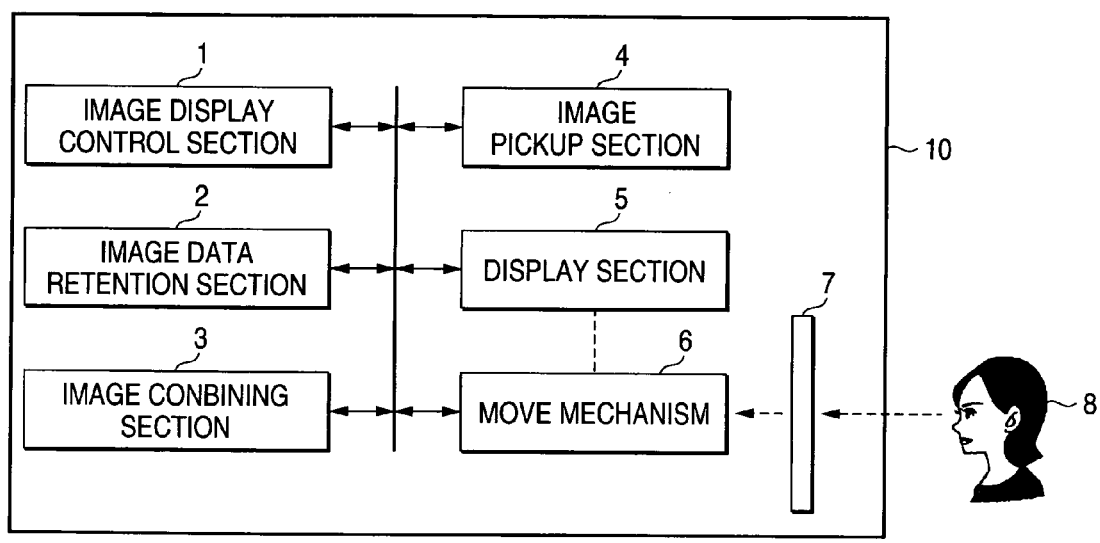
FIG. 1 is a schematic block diagram to show a display apparatus to describe a first embodiment of the invention.

Now, a description will be given in more detail of preferred embodiments of the present invention with reference to the accompanying drawings.

The display apparatus of the invention includes a half mirror for allowing light incident from the rear to pass through to the front and reflecting light incident from the front toward the front; a display section being placed at the rear of the half mirror; an image pickup section for picking up an image of a user and generating user image data; an image data retention section for retaining a plurality of pieces of attachment member image data; an image combining section for combining the attachment member image data selectively read from the image data retention section and the user image data to generate combined image data; and an image display control section for displaying the combined image data on the display section.

According to the display apparatus of the invention, the user image data provided by the image pickup section and the attachment member image data of hair style, hair color, etc., previously retained can be combined for display, so that whether or not the hairstyle becomes the user can be precisely determined before actual hair cutting or hair setting is conducted.

The display apparatus of the invention further includes a move mechanism for moving the display section along the half mirror.

According to the display apparatus of the invention, to use the display apparatus in a beauty salon, etc., the display section can be moved to the position opposed to the seat in which the user sits among a plurality of seats installed in front of the half mirror, so that the needs of a plurality of users can be met with a small capacity.

The image display control section of the display apparatus of the invention places the combined image data in a nondisplay mode, thereby causing the half mirror to function as a mirror.

According to the display apparatus of the invention, the combined image data is placed in a nondisplay mode, whereby the half mirror can be made to function as a mirror, so that any desired hair style, etc., can be selected and check after completion of hair setting can be easily made.

The image display control section of the display apparatus of the invention supplies a black signal to a predetermined area of the display section for causing the predetermined area to function as a mirror.

According to the display apparatus of the invention, a black signal is supplied to a predetermined area of the display section, whereby the half mirror can be made to function as a mirror, so that any desired hair style, etc., can be selected and check after completion of hair setting can be easily made.

The image pickup section of the display apparatus of the invention picks up an image of the whole body of the user and the image combining section combines the user image data provided by picking up the image of the whole body of the user and the attachment member image data.

The display apparatus of the invention can simulate the balance of total fashion on the screen, so that the user can select any desired fashion items precisely and user's taste can be pleased sufficiently.

The image pickup section of the display apparatus of the invention picks up an image of a part of the body of the user and the image combining section combines the user image data provided by picking up the image of the part of the body of the user and the attachment member image data.

According to the display apparatus of the invention, for example, the image data of the user face and the attachment member image data can be combined for display, so that the user can easily select the fashion items becoming the user.

The image display control section of the display apparatus of the invention places any other area than the part of the body of the user in the display section in a nondisplay mode.

According to the display apparatus of the invention, other areas than the outer garment portion of the user can be made to function as a mirror, for example, so that the user can easily select the outer garment becoming the dress of the user.

The image display control section of the display apparatus of the invention can display a television picture on the display section.

Since the display apparatus of the invention can display a television picture on the display section, the user can have a good time while he or she gets a permanent, etc., in a beauty salon, etc., and the level of customer satisfaction can be enhanced.

The image processing system of the invention includes an image processing server and a display apparatus connected through a network, wherein the image processing server includes an image data retention section for retaining a plurality of pieces of attachment member image data and an image combining section for combining the attachment member image data selectively read from the image data retention section and the image data sent from the display apparatus through the network to generate combined image data, and wherein the display apparatus includes a half mirror for allowing light incident from the rear to pass through to the front and reflecting light incident from the front toward the front, a display section being placed at the rear of the half mirror, an image pickup section for picking up an image of a user and generating image data, and an image display control section for displaying the combined image data sent from the image processing server through the network on the display section.

According to the image processing system of the invention, the image processing server includes the image data retention section for retaining a plurality of pieces of attachment member image data, so that the attachment member image data to be displayed on a plurality of display sections can be retained and managed collectively. If the attachment member image data in the image processing server is updated in response to the trend of fashion items, the system can always keep up with the latest fashions.

The display section of the display apparatus or the image processing system of the invention is a plasma display panel.

To use the display apparatus or the image processing system of the invention in a well-lighted room, high-brightness, high-precision display can be produced.

As described above, according to the display apparatus of the invention, the user image data provided by the image pickup section and the attachment member image data of hair style, hair color, etc., previously retained can be combined for display, so that whether or not the hairstyle becomes the user can be precisely determined before actual hair cutting or hair setting is conducted.

According to the display apparatus of the invention, to use the display apparatus in a beauty salon, etc., the display section can be moved to the position opposed to the seat in which the user sits among a plurality of seats installed in front of the half mirror, so that the needs of a plurality of users can be met with a small capacity.

According to the display apparatus of the invention, the combined image data is placed in a nondisplay mode, whereby the half mirror can be made to function as a mirror, so that any desired hair style, etc., can be selected and check after completion of hair setting can be easily made.

The display apparatus of the invention can simulate the balance of total fashion on the screen, so that the user can select any desired fashion items precisely and user's taste can be pleased sufficiently.

First Embodiment

FIG. 1 is a schematic block diagram to show a display apparatus 10 to describe a first embodiment of the invention. As shown in the figure, the display apparatus 10 of the invention includes a half mirror 7 for allowing light incident from the rear (opposite side to a user 8) to pass through to the front (user 8 side) and reflecting light incident from the front toward the front, a display section 5 placed at the rear of the half mirror 7, an image pickup section 4 for picking up an image of the user 8 and generating user image data, an image data retention section 2 for retaining a plurality of pieces of attachment member image data, an image combining section 3 for combining the attachment member image data selectively read from the image data retention section 2 and the user image data to generate combined image data, an image display control section 1 for displaying the combined image data on the display section 5, and a move mechanism 6 for moving the display section 5 along the half mirror 7.

The image display control section 1 controls the whole operation of the display apparatus 10 and is mainly implemented as a processor operating according to a predetermined program. The image pickup section 4 picks up an image of the head or the whole body of the user 8 and is implemented as a digital camera, etc. The image data retention section 2 is implemented as ROM, RAM, a hard disk, or the like for retaining the image data of the user 8 provided by the image pickup section 4 and image data of hairstyles, hair colors, etc., to be combined with the image data of the user 8.

The image combining section 3 combines the image data of the user 8 provided by the image pickup section 4 and the image data of hairstyles, etc., retained in the image data retention section 2 in accordance with a predetermined program under the control of the image display control section 1. Preferably, the image combining section 3 adopts a dedicated hardware configuration to increase the image display speed.

The display section 5 is installed at the rear of the half mirror 7 and uses a plasma display panel, a liquid crystal display, etc. To use the display apparatus in a well-lighted room, preferably a plasma display panel that can produce high-brightness, high-precision display is used.

The move mechanism 6 moves the display section 5 right and left (viewed from the user 8) at the rear of the half mirror 7 and is made up of mechanical parts of a motor, casters, a rail, etc., and a drive circuit. The configuration of the move mechanism 6 is described later.

Figure 2:
FIG. 2 is a schematic representation to show how the display apparatus of the first embodiment of the invention is used in a beauty salon, etc.

Next, a use example of the display apparatus 10 shown in FIG. 1 will be discussed. FIG. 2 is a schematic representation to show how the display apparatus 10 of the embodiment is used in a beauty salon, etc. The display section 5 of the display apparatus 10 of the embodiment is installed at the rear of the half mirror 7 installed in front of the user 8 and a hairdresser 9.

When the display apparatus 10 is not used, the half mirror 7 functions as a normal mirror to reflect the figures of the user 8 and the hairdresser 9 for hair cutting and hair setting. On the other hand, to use the display apparatus 10, the user 8 and the hairdresser 9 can see the image displayed on the display section 5 installed at the rear of the half mirror 7 through the half mirror 7.

The image pickup section 4 of a digital camera, etc., (not shown) is provided in front of the half mirror 7 for picking up an image of the face and hairstyle of the user 8 to generate user image data.

On the other hand, the attachment member image data of hair styles, hair colors, etc., is retained in the image data retention section 2 of the display apparatus 10. The image combining section 3 combines the attachment member image data of hairstyles, etc., selectively read from the image data retention section 2 and the user image data provided by picking up the image of the face of the user 8 to generate combined image data, and the combined image data is displayed on the display section 5. FIG. 2 shows a state in which the combined image data is displayed on the display section 5.

Thus, according to the display apparatus 10 of the embodiment, the image data of the face, etc., of the user 8 provided by the image pickup section 4 and the image data of hair style, hair color, etc., previously retained can be combined for display, so that whether or not the hairstyle becomes the user 8 can be precisely determined before actual hair cutting or hair setting is conducted.

Figure 3:
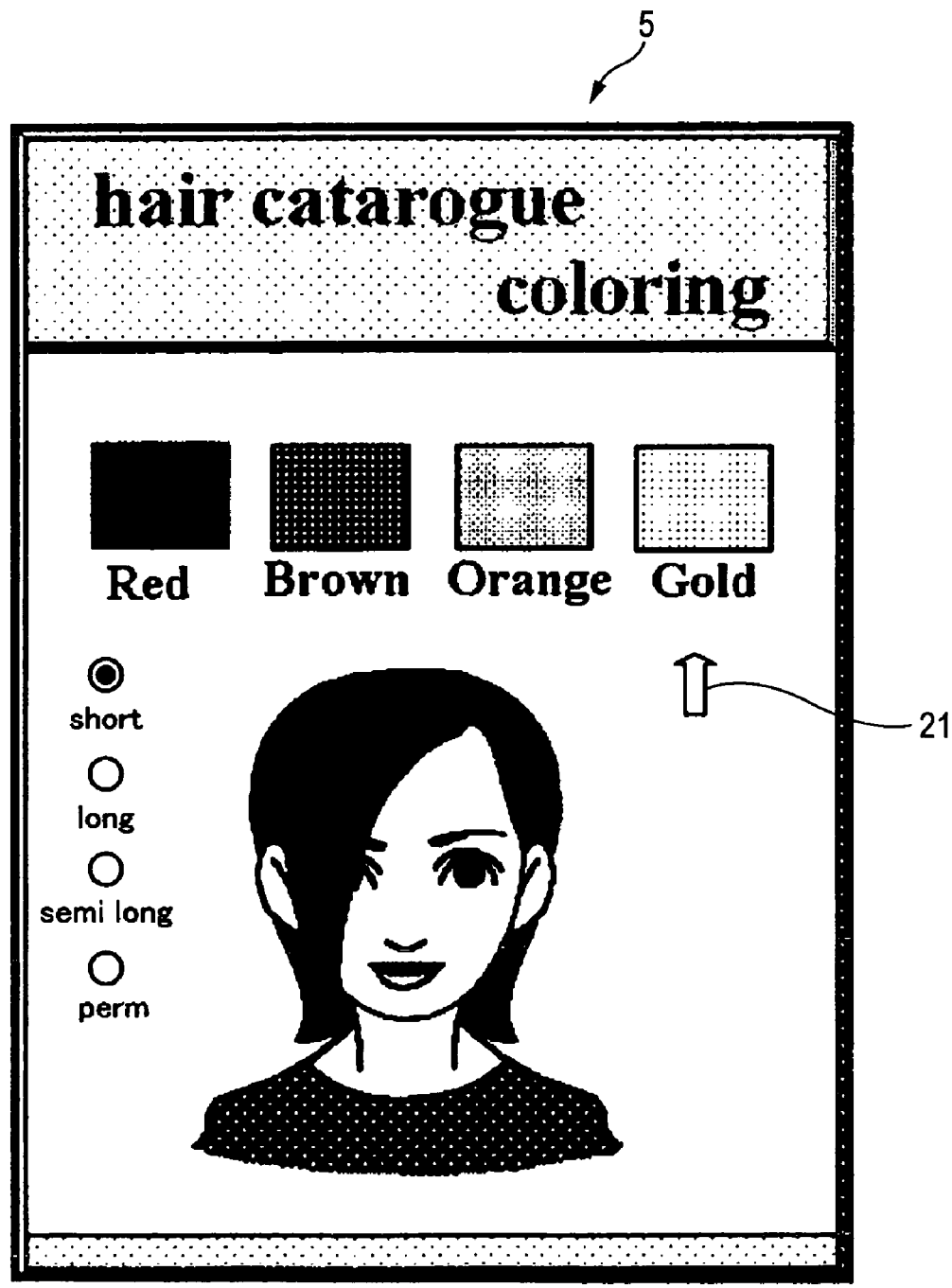
FIG. 3 is a schematic representation to show an example of a screen displayed on a display section 5 of the display apparatus of the first embodiment of the invention.

FIG. 3 is a schematic representation to show an example of a screen displayed on the display section 5 of the display apparatus 10 of the embodiment. The user 8 can select and display a hairstyle and a hair color to his or her liking while seeing the screen of the display section 5.

For example, if the user 8 or the hairdresser 9 uses an input unit such as a remote control (not shown) to select a radio button of "short" with a cursor 21 and points to an icon of "Brown," a combined image of superposing a hair style of short hair dyed in brown on the image of the face of the user 8 provided by the image pickup section 4 is displayed.

Thus, the display apparatus 10 of the embodiment enables the user 8 or the hairdresser 9 to select a hairstyle as desired using the remote control, etc., so that the hairstyle, etc., becoming the face of the user 8 can be selected precisely.

Figure 4:
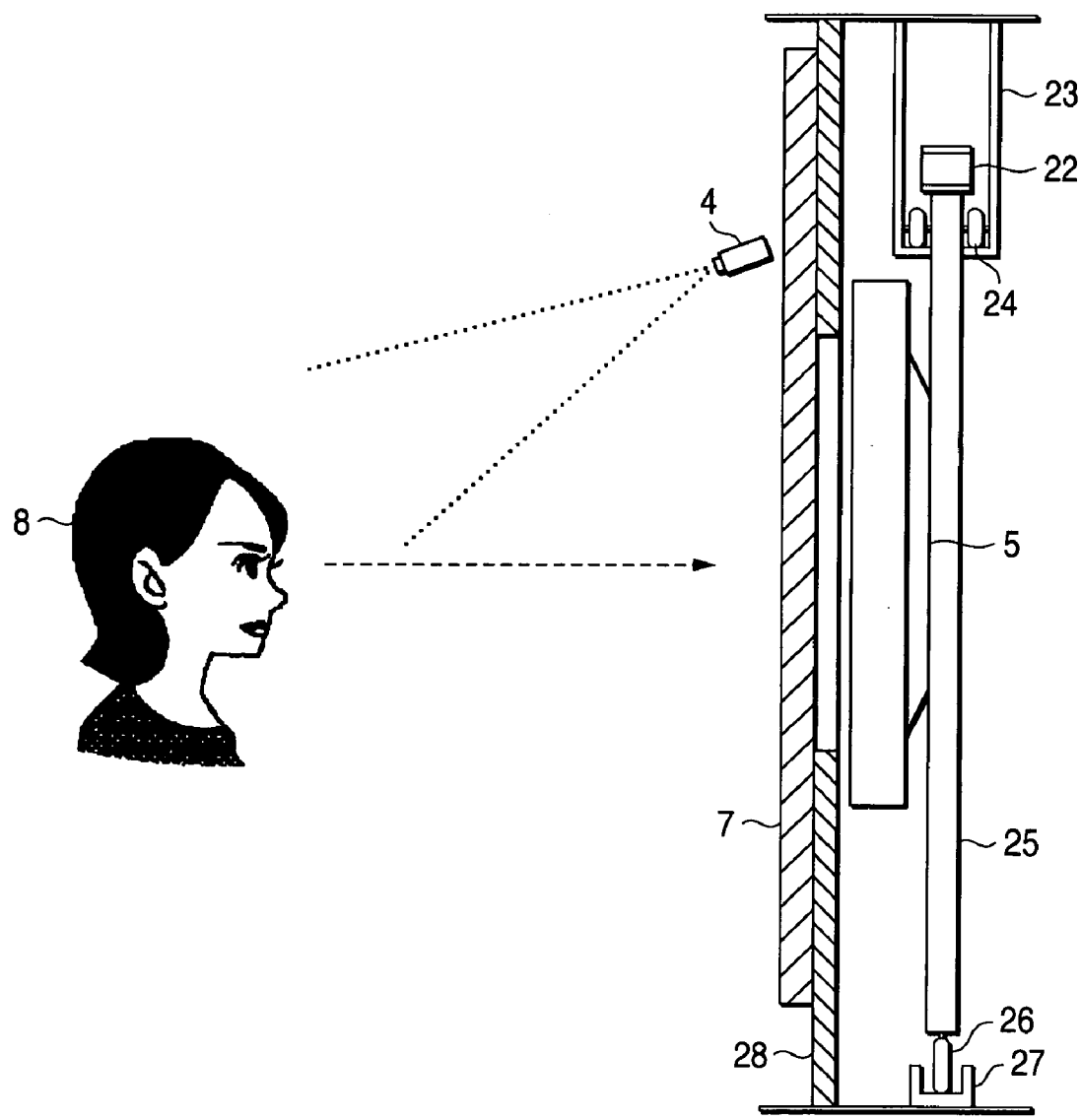
FIG. 4 is a fragmentary sectional view of the display apparatus of the first embodiment of the invention viewed from the side thereof.

FIG. 4 is a fragmentary sectional view of the display apparatus 10 of the embodiment viewed from the side thereof. In the display apparatus 10 of the embodiment, the half mirror 7 is attached to the front (user 8 side) of a wall plate 28 having an opening in the portion opposed to the display face of the display section 5, the image pickup section 4 of a digital camera, etc., is installed in front of the upper part of the half mirror 7, and the display section 5 is placed at the rear of the wall plate 28.

The display section 5 is fixed to a display section retention square pipe 25 and casters 24 and 26 and a motor 22 are attached to the display section retention square pipe 25. The casters 24 and 26 are combined so as to be able to move along rails 23 and 27. As the motor 22 is rotated, the display section 5 can move vertically to the plane of the figure, namely, in the lateral direction of the user 8 along the half mirror 7.

Figure 5:
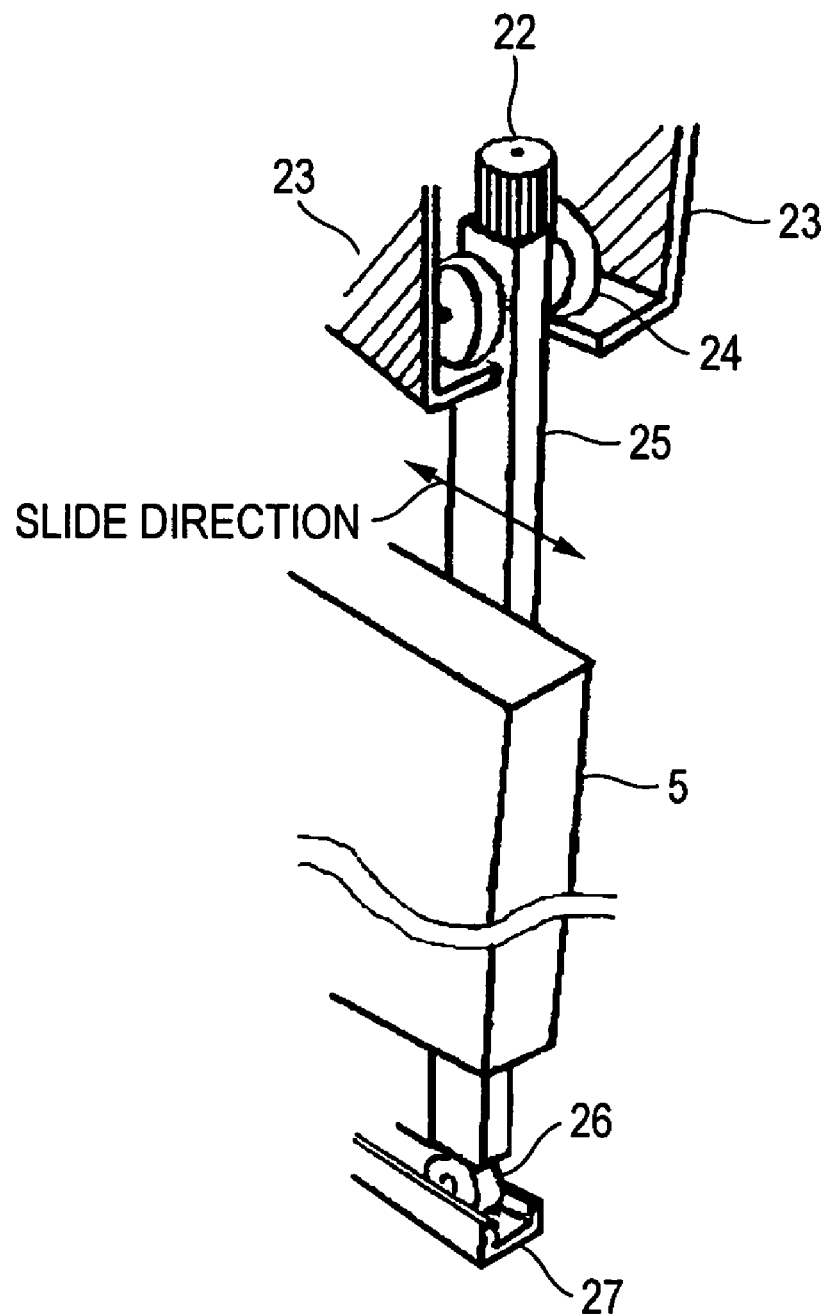
FIG. 5 is a perspective view of a move mechanism 6 of the display apparatus of the first embodiment of the invention viewed from the front of the display section 5.
Figure 6:
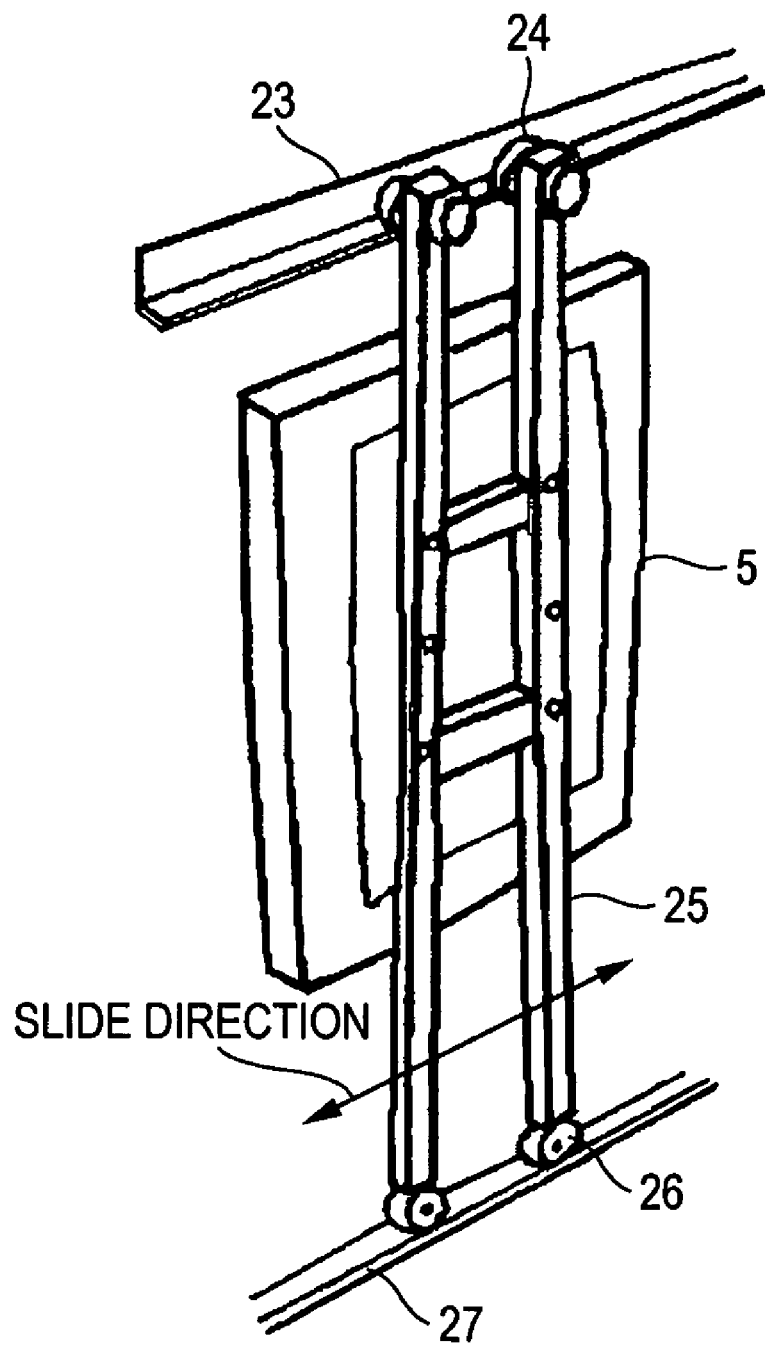
FIG. 6 is a perspective view of the move mechanism 6 of the display apparatus of the first embodiment of the invention viewed from the rear of the display section 5.

FIG. 5 is a perspective view of the move mechanism 6 of the display apparatus 10 of the embodiment viewed from the front of the display section 5. FIG. 6 is a perspective view of the move mechanism 6 of the display apparatus 10 of the embodiment viewed from the rear of the display section 5.

As shown in FIGS. 5 and 6, in the display apparatus 10 of the embodiment, the display section retention square pipe 25 retains the display section 5 and as the motor 22 is rotated, the casters 24 and 26 attached to the display section retention square pipe 25 can move along the rails 23 and 27 for sliding the display section 5 in the arrow direction.

Thus, to use the display apparatus 10 of the embodiment in a beauty salon, etc., the display section 5 can be moved to the position opposed to the seat in which the user 8 sits among a plurality of seats installed in front of the half mirror 7, so that the needs of a plurality of users 8 can be met with a small capacity.

In the description given above, displaying the image data of the face of the user 8 picked up by the image pickup section 5 on the display section 5 is taken as an example. However, a black signal can also be output to the area corresponding to the face of the user 8 in the display section 5 for causing the area to function as a mirror and the image data of a hair style can also be combined with the image of the face of the user 8.

Further, after hair setting of the user 8 is complete, the hair portion of the user 8 can also be caused to function as a mirror for checking the actual hair style and the image data of the face with foundation changed in the face portion of the user 8 can also be displayed for the user 8 to select foundation matching the actual hair style.

Thus, according to the display apparatus 10 of the embodiment, a partial area of the half mirror 7 can be made to function as a mirror, so that any desired hair style and foundation can be selected and check after completion of hair setting can be easily made.

The display apparatus 10 of the embodiment can also display a television picture, so that the user 8 can have a good time while he or she gets a permanent, etc., in a beauty salon, etc., and the level of customer satisfaction can be enhanced.

Second Embodiment

Figure 7:
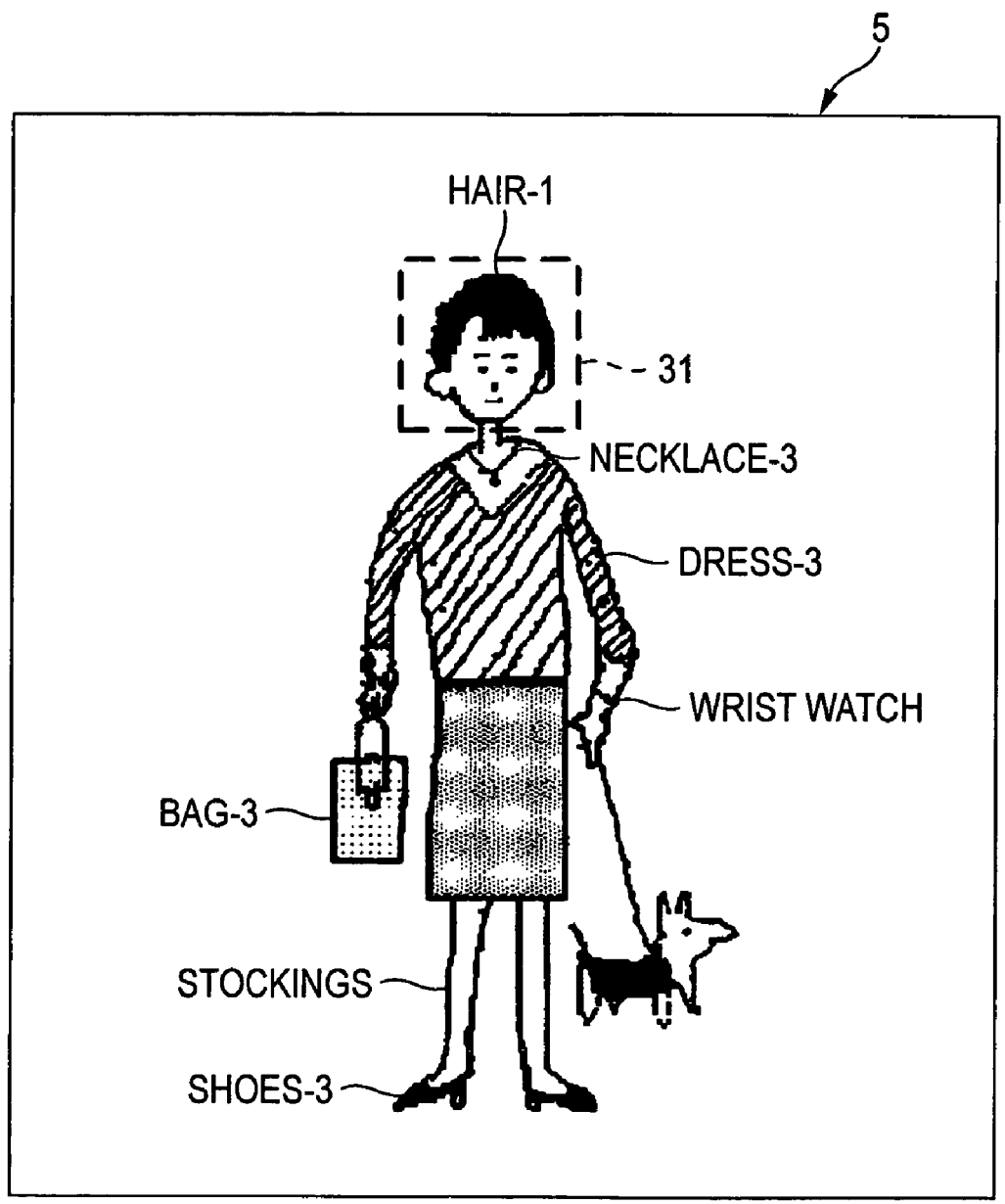
FIG. 7 is a schematic representation to show a display screen of a display apparatus 10 to describe a second embodiment of the invention.

FIG. 7 is a schematic drawing to show a display screen of a display section 5 to describe a second embodiment of the invention. A display apparatus 10 of the second embodiment combines attachment member image data with the image data of the whole body image or a part of the body image of a user 8 picked up for display to simulate the balance of total fashion on a display screen in a dress shop in a department store, etc., for example.

Figure 8:
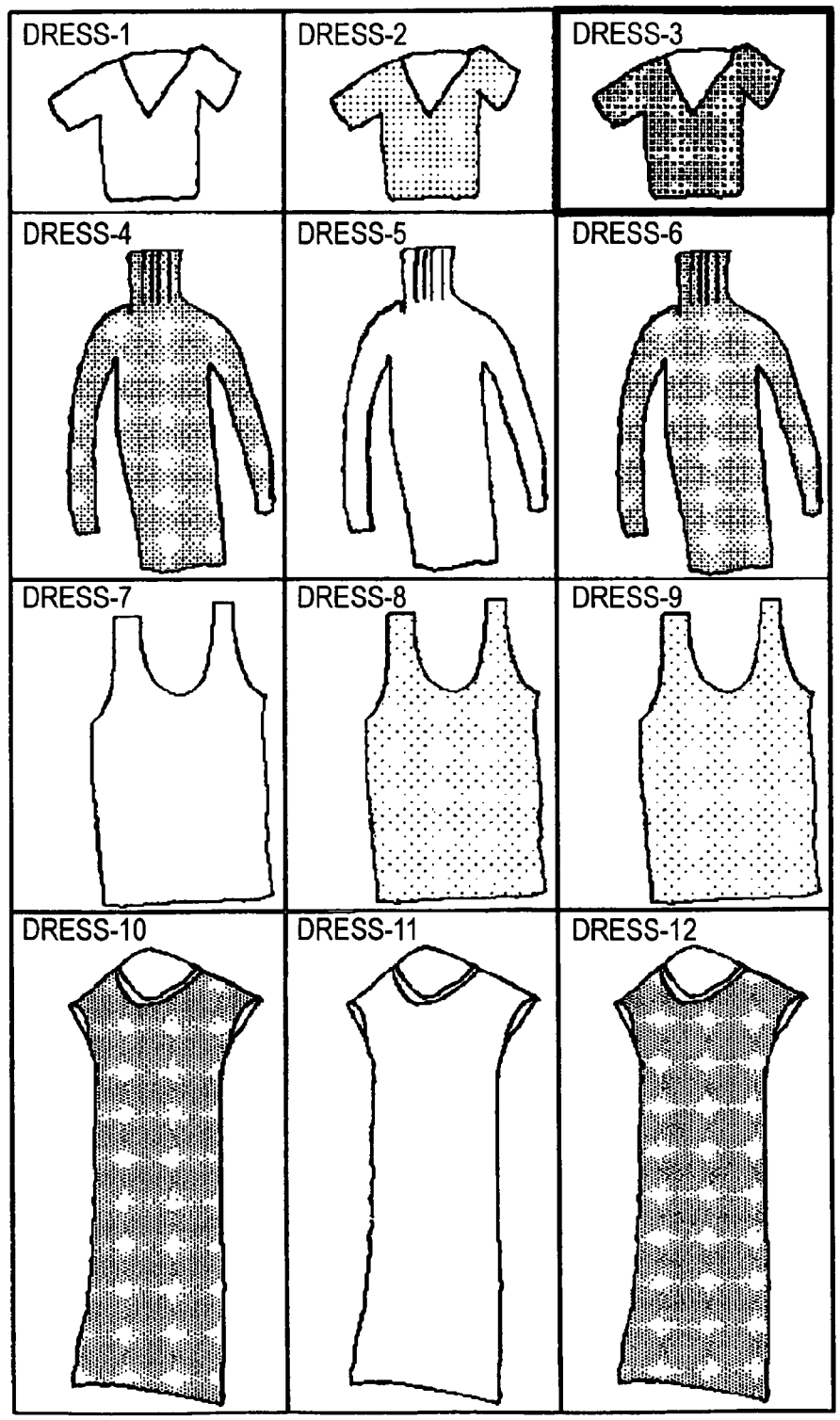
FIG. 8 is a drawing to show examples of attachment member image data retained in an image data retention section.
Figure 9:
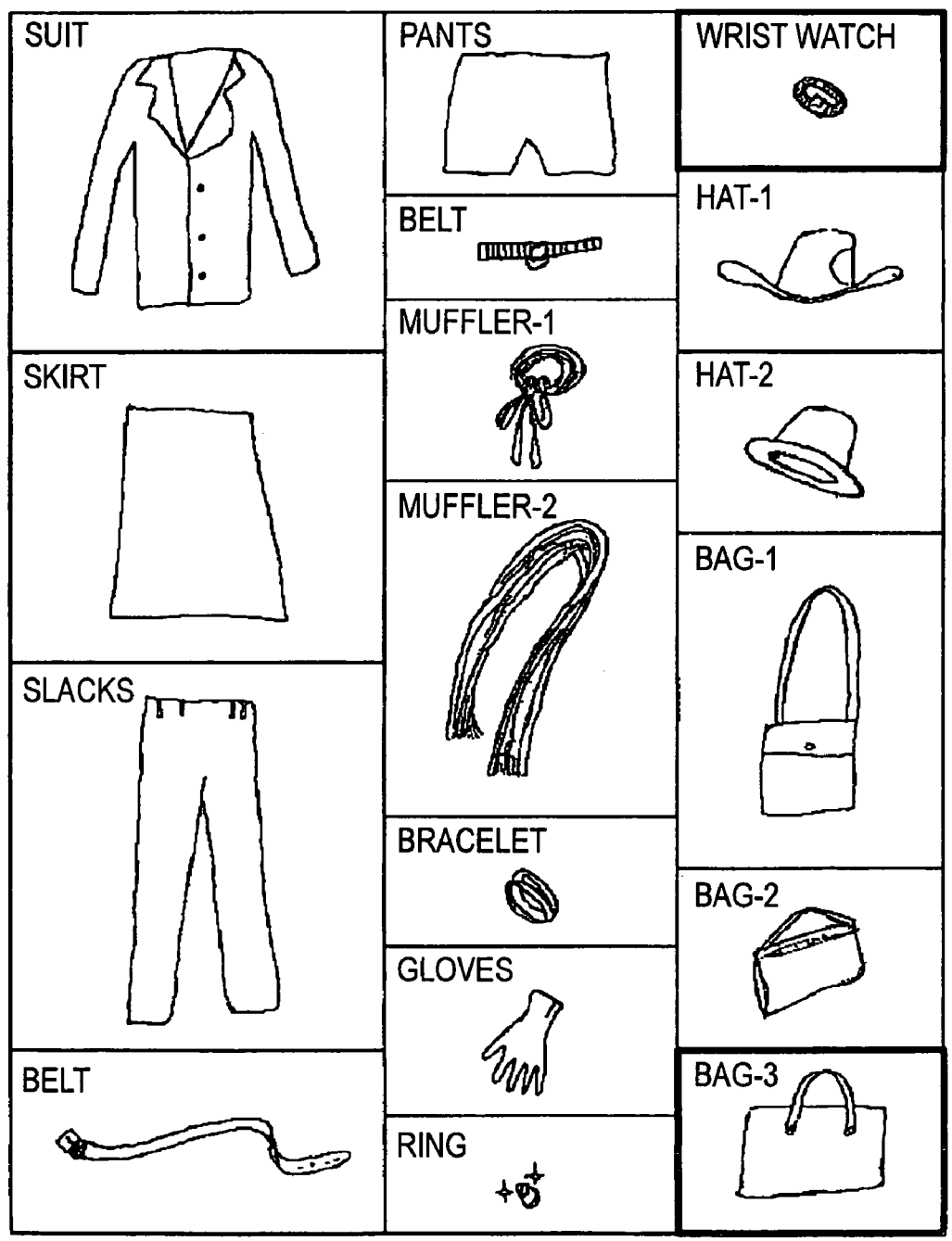
FIG. 9 is a drawing to show examples of attachment member image data retained in the image data retention section.
Figure 10:
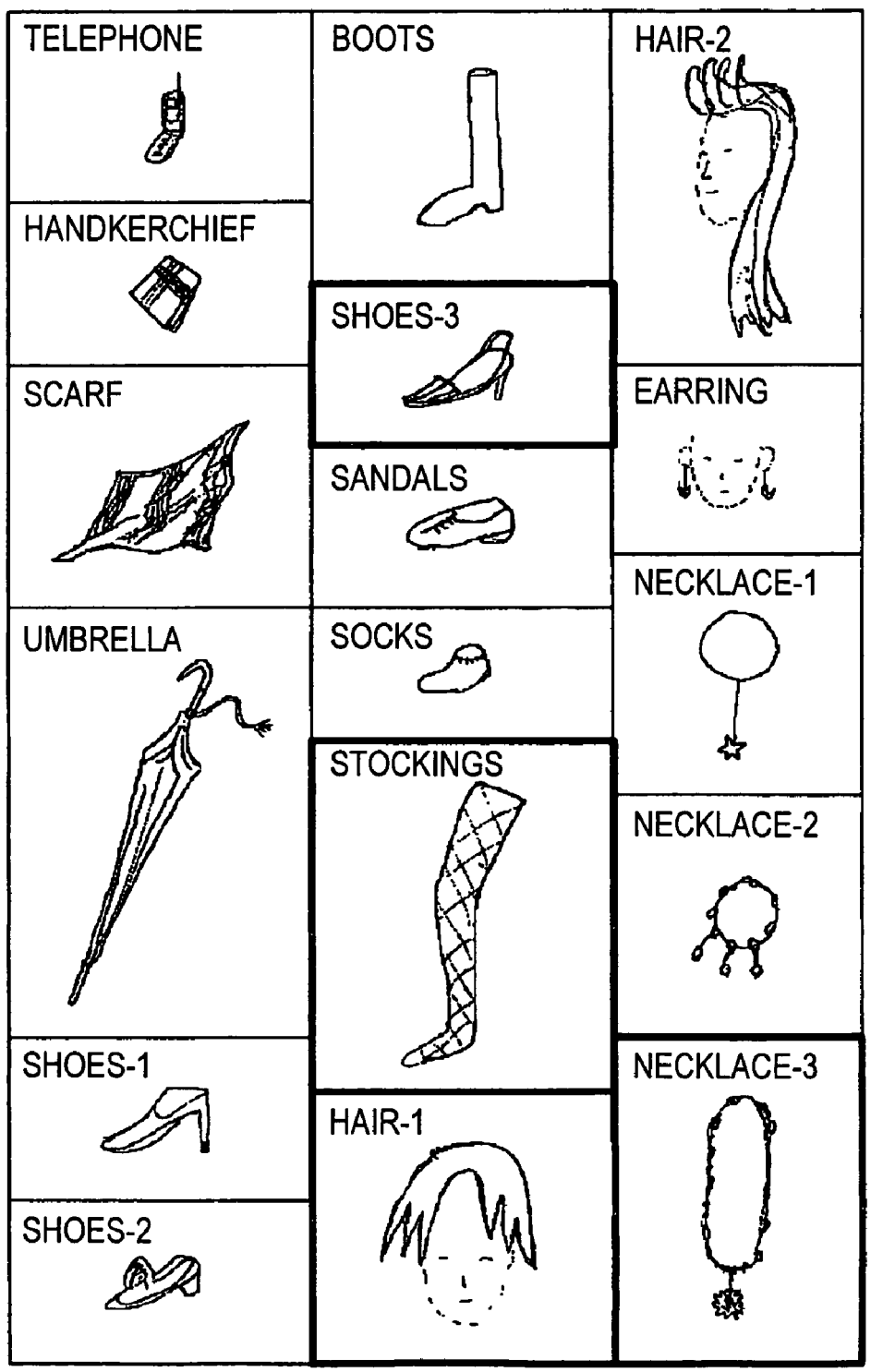
FIG. 10 is a drawing to show examples of attachment member image data retained in the image data retention section.

FIGS. 8 to 10 show examples of attachment member image data retained in an image data retention section 2. FIG. 8 shows various outer garments different in design, color, size, etc., from DRESS-1 to DRESS-12. FIGS. 9 and 10 show various fashion items from SUIT to NECKLACE-3. The fashion items further include various subitems different in design, color, size, etc., any of which can be selected.

FIG. 7 shows display produced by combining HAIR-1, NECKLACE-3, DRESS-3, WRISTWATCH, BAG-3, STOCKINGS, and SHOES-3 surrounded by thick lines in FIGS. 8 to 10 with the image data of the face of the user 8 picked up by an image pickup section 4.

Thus, the display apparatus 10 of the second embodiment can simulate the balance of total fashion on the screen, so that the user 8 can select any desired fashion items precisely and user's taste can be pleased sufficiently.

The whole body image of the user 8 may be picked up by the image pickup section 4 and attachment member image data may be combined with each part of the user image data provided by picking up the whole body image of the user 8. Alternatively, a part of the body of the user 8 may be picked up by the image pickup section 4 and the user image data provided by picking up the part image of the body of the user 8 and attachment member image data corresponding to any other part of the body of the user 8 may be combined with each other.

Video output of the face portion of the user 8 indicated by a dotted line 31 in FIG. 7 can also be produced as a black signal for causing the portion of a half mirror 7 as a mirror. In doing so, the face of the user 8 is reflected in the face portion and the attachment member image data of fashion items is displayed in other portions, so that the user 8 can easily select the fashion items becoming the user 8.

Alternatively, if the image data of an outer garment is displayed in the upper half of the body of the user 8 and other portions than the upper half of the body are made to function as a mirror, for example, the user 8 can easily select the outer garment becoming the actual dress of the user 8.

Third Embodiment

Figure 11:
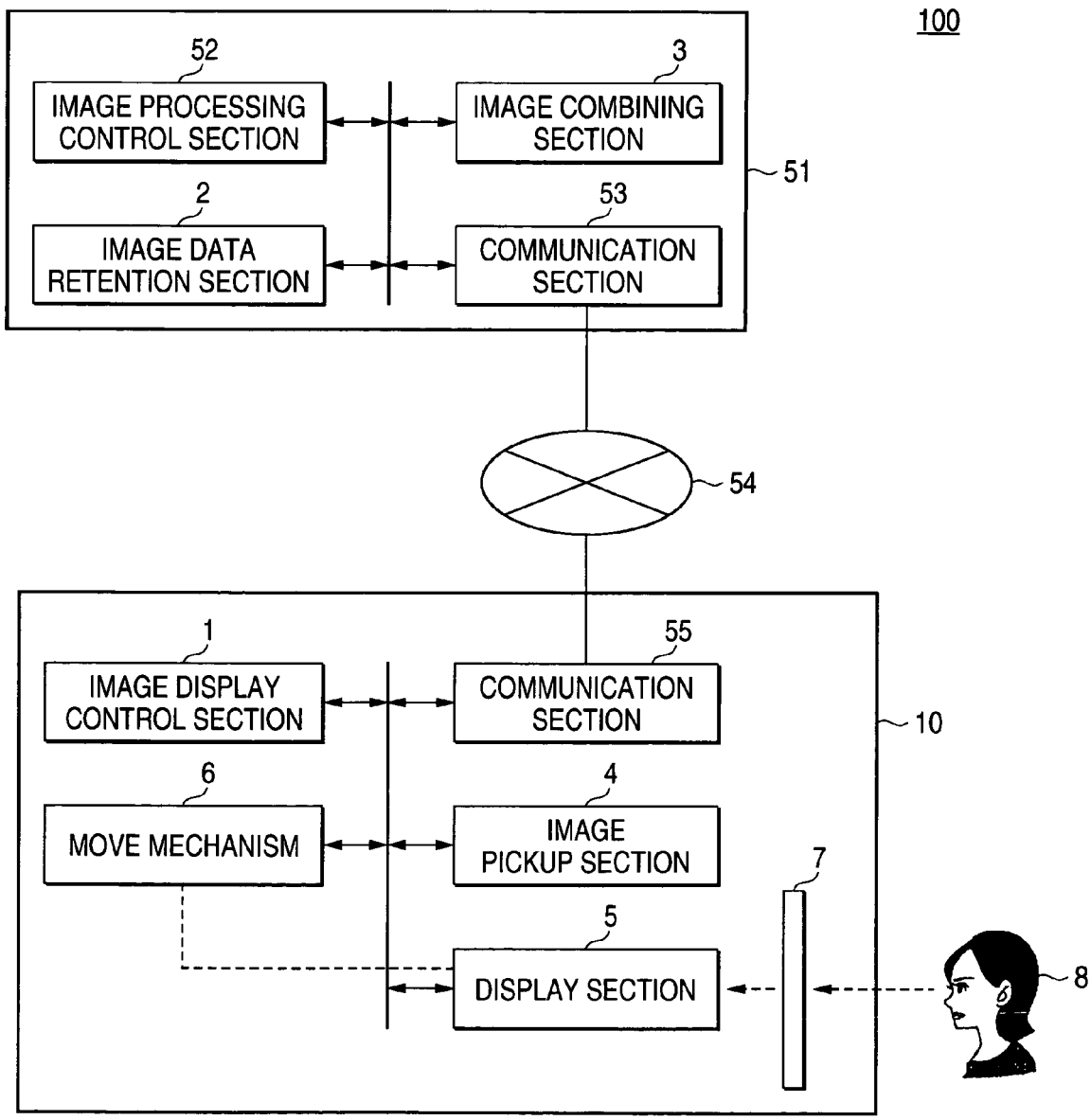
FIG. 11 is a schematic representation to show the schematic configuration of an image processing system according to a third embodiment of the invention.

FIG. 11 is a schematic representation to show the schematic configuration of an image processing system 100 according to a third embodiment of the invention. The image processing system 100 of the embodiment includes an image processing server 51 and a display apparatus 10 connected through a network 54. The image processing server 51 includes an image data retention section 2 for retaining a plurality of pieces of attachment member image data, an image combining section 3 for combining the attachment member image data selectively read from the image data retention section 2 and the image data sent from the display apparatus 10 through the network 54 and a communication section 53 to generate combined image data, and an image processing control section 52 mainly implemented as a processor operating according to a predetermined program to control the whole operation of the image processing server 51.

The display apparatus 10 includes a half mirror 7 for allowing light incident from the rear to pass through to the front and reflecting light incident from the front toward the front, a display section 5 placed at the rear of the half mirror 7, an image pickup section 4 for picking up an image of a user 8 and generating image data, and an image display control section 1 for displaying on the display section 5 the combined image data sent from the image processing server 51 through the network 54 and a communication section 55.

Thus, according to the image processing system 100 of the embodiment, the image processing server 51 includes the image data retention section 2 for retaining a plurality of pieces of attachment member image data, so that the attachment member image data to be displayed on a plurality of display sections 5 can be retained and managed collectively. If the attachment member image data in the image processing server 51 is updated in response to the trend of fashion items, the system can always keep up with the latest fashions. The operation of the display apparatus 10 is similar to that in the first embodiment and therefore will not be discussed again.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A display apparatus comprising:
   a half mirror for allowing light incident from a rear side of the half mirror to pass through to a front side of the half mirror and reflecting the light incident from the front side of the half mirror toward the front side of the half mirror;
   a display section being placed at the rear of the half mirror;
   an image pickup section for picking up an image of a user and generating user image data;
   an image data retention section for retaining a plurality of pieces of attachment member image data;
   an image combining section for combining the attachment member image data selectively read from the image data retention section and the user image data to generate combined image data; and
   an image display control section for displaying the combined image data on the display section,
   wherein the image display control section places a partial area of the display section in a nondisplay mode, thereby causing a part of the half mirror corresponding to the partial area to function as a mirror, the partial area excluding an area of the display section on which the combined image data is displayed,
   wherein the display section is opposed to the user,
   wherein the image pickup portion is disposed in a position outside a path through which the display section displays the combined image data to the user.

2. The display apparatus according to claim 1, the display apparatus further includes a move mechanism for moving the display section along the half mirror.

3. The display apparatus according to claim 1, wherein the image pickup section picks up an image of a whole body of the user, and
the image combining section combines the user image data provided by picking up the image of the whole body of the user and the attachment member image data.

4. The display apparatus according to claim 1, wherein the image pickup section picks up an image of a part of the body of the user, and
the image combining section combines the user image data provided by picking up the image of the part of the body of the user and the attachment member image data.

5. The display apparatus as claimed in claim 4, wherein said image display control section places any area other than the part of the body of the user in said display section in a nondisplay mode.

6. The display apparatus according to claim 1, wherein the image display control section is capable of displaying a television picture on the display section.
an image pickup section for picking up an image of a user and generating image data; and
an image display control section for displaying the combined image data sent from the image processing server through the network on the display section,
wherein the image display control section places the combined image data in a nondisplay mode, thereby causing the half mirror to function as a mirror,
wherein the display section is opposed to the user,
wherein the image pickup portion is disposed in a position outside a path through which the display section displays the combined image data to the user.

7. The display apparatus according to claim 1, wherein the display section is a plasma display panel.

8. A display apparatus comprising:
a half mirror for allowing light incident from a rear side of the half mirror to pass through to a front side of the half mirror and reflecting the light incident from the front side of the half mirror toward the front side of the half mirror;
a display section being placed at the rear of the half mirror;
an image pickup section for picking up an image of a user and generating user image data;
an image data retention section for retaining a plurality of pieces of attachment member image data;
an image combining section for combining the attachment member image data selectively read from the image data retention section and the user image data to generate combined image data; and
an image display control section for displaying the combined image data on the display section,
wherein the image display control section supplies a black signal to a predetermined area of the display section for causing an area of the half mirror corresponding to the predetermined area to function as a mirror, the predetermined area excluding an area of the display section on which the combined image data is displayed,
wherein the display section is opposed to the user,
wherein the image pickup portion is disposed in a position outside a path through which the display section displays the combined image data to the user.

9. The display apparatus according to claim 8, the display apparatus further includes a move mechanism for moving the display section along the half mirror.

10. The display apparatus according to claim 8, wherein the image pickup section picks up an image of a whole body of the user, and
the image combining section combines the user image data provided by picking up the image of the whole body of the user and the attachment member image data.

11. The display apparatus according to claim 8, wherein the image pickup section picks up an image of a part of the body of the user, and
the image combining section combines the user image data provided by picking up the image of the part of the body of the user and the attachment member image data.

12. The display apparatus as claimed in claim 11, wherein said image display control section places any area other than the part of the body of the user in said display section in a nondisplay mode.

13. The display apparatus according to claim 8, wherein the image display control section is capable of displaying a television picture on the display section.

14. The display apparatus according to claim 8, wherein the display section is a plasma display panel.

15. A display apparatus comprising:
a half mirror for allowing light incident from a rear side of the half mirror to pass through to a front side of the half mirror and reflecting the light incident from the front side of the half mirror toward the front side of the half mirror;
a display section being placed at the rear of the half mirror;
an image pickup section for picking up an image of a user and generating user image data;
an image data retention section for retaining a plurality of pieces of attachment member image data;
an image combining section for combining the attachment member image data selectively read from the image data retention section and the user image data to generate combined image data; and
an image display control section for displaying the combined image data on the display section,
wherein the image display control section comprises means for placing a partial area of the display section in a non-display mode causing at least part of the half mirror to function as a mirror, the partial area excluding an area of the display section on which the combined image data is displayed,
wherein the display section is opposed to the user,
wherein the image pickup portion is disposed in a position outside a path through which the display section displays the combined image data to the user.

16. A display apparatus comprising:
a half mirror for allowing light incident from a first side of the half mirror to pass through to a second side of the half mirror and reflecting the light incident from the second side of the half mirror toward the second side of the half mirror;
a display being placed at the first side of the half mirror;
an image pickup circuit that picks up an image of a user and generates user image data;
a memory that retains a plurality of pieces of attachment member image data;
a control circuit that combines the attachment member image data selectively read from the memory and the user image data to generate combined image data, and that displays the combined image data on the displays,
wherein the control circuit produces a black signal on at least a part of an area of the display on which the combined image data is not displayed such that at least a part of the half mirror corresponding to the part of the display on which the black signal is produced is caused to function as a mirror,
wherein the display is opposed to the user,
wherein the image pickup circuit is disposed in a position outside a path through which the display section displays the combined image data to the user.

* * * * *